(12) United States Patent
Mitake

(10) Patent No.: US 11,907,777 B2
(45) Date of Patent: Feb. 20, 2024

(54) INFORMATION CODE, INFORMATION CODE GENERATION DEVICE, INFORMATION CODE READOUT DEVICE, PROGRAM, AND INFORMATION CODE UTILIZATION SYSTEM

(71) Applicant: VARIETY M-1 INC., Kanagawa (JP)

(72) Inventor: Toshiaki Mitake, Kanagawa (JP)

(73) Assignee: VARIETY M-1 INC., Kanagawa (JP)

( * ) Notice: Subject to any disclaimer, the term of this patent is extended or adjusted under 35 U.S.C. 154(b) by 114 days.

(21) Appl. No.: 17/623,222

(22) PCT Filed: Apr. 7, 2021

(86) PCT No.: PCT/JP2021/014796
§ 371 (c)(1),
(2) Date: Dec. 27, 2021

(87) PCT Pub. No.: WO2021/206123
PCT Pub. Date: Oct. 14, 2021

(65) Prior Publication Data
US 2022/0366158 A1    Nov. 17, 2022

(30) Foreign Application Priority Data

Apr. 10, 2020   (JP) .................... 2020-071241

(51) Int. Cl.
*G06K 7/10*   (2006.01)
*G06K 1/12*   (2006.01)
(Continued)

(52) U.S. Cl.
CPC ............. *G06K 1/123* (2013.01); *G06F 21/32* (2013.01); *G06K 19/06037* (2013.01); *G06K 2019/06225* (2013.01)

(58) Field of Classification Search
CPC .......... G06F 21/32; G06K 1/12; G06K 19/06; G06K 7/10; G06K 7/12; G06K 7/14; G06T 7/90
See application file for complete search history.

(56) References Cited

U.S. PATENT DOCUMENTS 6,360,948 B1    3/2002   Yang et al.
2007/0174482 A1*  7/2007   Yajima ................. G06F 40/174
709/238

(Continued)

FOREIGN PATENT DOCUMENTS

JP   H10283446 A   10/1998
JP   2000163506 A   6/2000
(Continued)

OTHER PUBLICATIONS

International Search Report in PCT/JP2021/014796, dated May 11, 2021. 4pp.

(Continued)

*Primary Examiner* — Thien M Le
(74) *Attorney, Agent, or Firm* — HAUPTMAN HAM, LLP

(57) ABSTRACT

The information code has an information code area constituted of colored information cells with two or more colors, the information code area having the specific information recorded using the information cells as information units, and a teacher code area having teacher cells with the same colors and the same number of colors as the information cells so as to identify the colors of the information cells. In the information code, the teacher code area is placed away from the information code area or inside the information code area.

13 Claims, 8 Drawing Sheets

(51) Int. Cl.
*G06F 21/32* (2013.01)
*G06K 19/06* (2006.01)

(56) References Cited

U.S. PATENT DOCUMENTS

| | | | |
|---|---|---|---|
| 2008/0035730 A1* | 2/2008 | Look | G06K 19/06037 |
| | | | 235/462.07 |
| 2009/0090786 A1* | 4/2009 | Hovis | G06K 19/06168 |
| | | | 235/494 |
| 2009/0242649 A1 | 10/2009 | Mizukoshi et al. | |
| 2011/0084852 A1* | 4/2011 | Szczerba | G01C 21/3626 |
| | | | 340/901 |
| 2011/0110586 A1 | 5/2011 | Takura et al. | |
| 2013/0044933 A1* | 2/2013 | Kenny | G01N 21/643 |
| | | | 382/133 |
| 2014/0024073 A1* | 1/2014 | Zhdaneev | G01N 7/18 |
| | | | 436/28 |
| 2014/0144991 A1 | 5/2014 | Tian et al. | |
| 2015/0332136 A1* | 11/2015 | Nosaka | G06K 19/06075 |
| | | | 235/494 |
| 2016/0012465 A1* | 1/2016 | Sharp | G06Q 20/321 |
| | | | 705/14.17 |
| 2016/0063516 A1* | 3/2016 | Terrazas | G06V 10/56 |
| | | | 705/7.29 |
| 2021/0325309 A1* | 10/2021 | Neagle | G02B 21/006 |
| 2022/0130267 A1* | 4/2022 | Li | G06F 11/30 |

FOREIGN PATENT DOCUMENTS

| | | |
|---|---|---|
| JP | 200993443 A | 4/2009 |
| JP | 2009259192 A | 11/2009 |
| JP | 201061217 A | 3/2010 |
| JP | 201148464 A | 3/2011 |
| JP | 201149758 A | 3/2011 |
| JP | 4838387 B2 | 12/2011 |
| JP | 2014112366 A | 6/2014 |
| JP | 2015121830 A | 7/2015 |
| JP | 2019192186 A | 10/2019 |

OTHER PUBLICATIONS

Office Action in JP Application No. 2020-071241, dated Dec. 15, 2020. 7pp.
Notice of Rejection in JP Application No. 2020-071241, dated Apr. 27, 2021. 5pp.
Office Action in JP Application No. 2021-065242, dated Jun. 29, 2021. 8pp.

* cited by examiner

INFORMATION CODE, INFORMATION CODE GENERATION DEVICE, INFORMATION CODE READOUT DEVICE, PROGRAM, AND INFORMATION CODE UTILIZATION SYSTEM

RELATED APPLICATIONS

The present application is a National Phase of International Application Number PCT/JP2021/014796, filed Apr. 7, 2021, and claims priority based on Japanese Patent Application No. 2020-071241, filed Apr. 10, 2020.

TECHNICAL FIELD

The present invention relates to an information code constituted of colored cells with two or more colors, an information code generation device, an information code reading device, a program, and an information code utilization system.

BACKGROUND ART

Conventionally, an information code having a data recording code portion that holds electronic data as a large number of colors given to respective cells arranged in a lattice has been known (for example, Patent Literature 1). In the information code according to Patent Literature 1, a finder code portion for obtaining information such as the number of cells, the number of colors, and a cell size of the data recording code portion is also arranged in a certain positional relationship with the data recording code portion.

CITATION LIST

Patent Literature

Patent Literature 1: JP 4838387 B2

SUMMARY

Technical Problem

The information code composed of colored cells, which uses two or more colors similar in hue to each other unlike an information code composed of white and block cells, has a problem that information stored in the information code cannot be appropriately read because true identification of the colors used in the information code sometimes fails depending on a light environment in which the information code is captured, a print environment and/or display environment of the information code, color fading with age of the printed information code, or the like.

In Patent Literature 1, the finder code portion allows for obtaining the number of colors of the cells constituting the data recording code portion, but does not calibrate or suggest cell colors of the data recording code and does not hold color information of all the cells constituting the data recording code, so true identification of the colors of the cells constituting the data recording code portion sometimes failed depending on an environment in which the information code is read or a state of the information code.

Solution to Problem

An information code according to the present invention has an information code area constituted of colored information cells with two or more colors arranged in a lattice, the information code area having specific information recorded using the information cells as information units, and a teacher code area having teacher cells with the same colors and the same number of colors as the information cells so as to identify the colors of the information cells, wherein the teacher code area is placed away from the information code area or inside the information code area.

In the information code, the teacher code area may include a plurality of teacher code areas, and the plurality of teacher code areas may be placed inside the information code area.

In the information code, the plurality of teacher code areas may be placed at regular intervals inside the information code area.

In the information code, the number of colors of the information cells and the number of colors of the teacher cells may be four or eight, and the number of the teacher cells included in the teacher code area may be the same as the number of colors of the teacher cells.

In the information code, the information code may include the information code area in which the specific information is recorded and an advertisement code area in which advertisement information is stored, and the advertisement code area may be constituted of advertisement cells with the same colors as the information cells and the teacher cells.

In the information code, the specific information recorded in the information code area may include personal information.

In the information code, the personal information recorded in the information code area may be image information of a part of a face of a person.

An information code generation device according to the present invention includes an information code generator configured to generate an information code having an information code area constituted of colored information cells with two or more colors, the information code area having specific information recorded using the information cells as information units, and a teacher code area having teacher cells with the same colors and the same number of colors as the information cells so as to identify the colors of the information cells, wherein the teacher code area is placed away from the information code area or inside the information code area.

An information code reading device according to the present invention is an information code reading device for reading the above-described information code, including a reader configured to read the information code, an identification unit configured to identify the colors of the information cells of the information code area based on color information of the teacher cells in the teacher code area of the information code read by the reader, and an acquisition unit configured to acquire the specific information recorded in the information code area based on the information cells of which the colors are identified by the identification unit.

A program according to a first aspect of the present invention causes a computer to execute a process of generating an information code having an information code area constituted of colored information cells with two or more colors, the information code area having specific information recorded using the information cells as information units, and a teacher code area having teacher cells with the same colors and the same number of colors as the information cells so as to identify the colors of the information cells, wherein the teacher code area is placed away from the information code area or inside the information code area.

A program according to a second aspect of the present invention is a program for reading the above-described information code, the program causing a computer to execute steps of reading the information cells of the information code area and the teacher cells of the teacher code area, identifying the colors of the information cells based on color information of the teacher cells, and acquiring the specific information recorded in the information code area based on the information cells of which the colors are identified.

An information code utilization system according to a first aspect of the present invention is an information code utilization system that utilizes the above-described information code, including an information code generator configured to generate the information code having the advertisement code area, the information code area, and the teacher code area, and an information code reader configured to read the information code, identify the colors of the advertisement cells of the advertisement code area based on color information of the teacher cells of the teacher code area to cause an advertisement to be displayed based on the advertisement information stored in the advertisement code area, and identify the colors of the information cells of the information code area based on the color information of the teacher cells of the teacher code area to output the specific information recorded in the information code area.

An information code utilization system according to a second aspect of the present invention is an information code utilization system that utilizes the above-described information code, including an information code generator configured to generate the information code having the information code area and the teacher code area, the information code area having the personal information recorded therein that includes biometric information, an information code reader configured to read the information code, identify the colors of the information cells of the information code area based on color information of the teacher cells of the teacher code area to acquire the biometric information from the information code area, and acquire user's biometric information directly from a user, and an authentication unit configured to check the biometric information acquired from the information code area against the user's biometric information acquired directly from the user.

A print medium according to the present invention has the above-described information code printed thereon.

Advantageous Effects of Invention

According to the present invention, specific information stored in an information code can be read with high accuracy.

DESCRIPTION OF EMBODIMENTS

Embodiments of an information code, an information code generation device, an information code reading device, a program, and an information code utilization system according to the present invention will be described with reference to the drawings. Note that, in the embodiments, a device having functions of an information code generation device and an information code reading device according to the present invention is described as an information code utilization device.

First Embodiment

Figure 1:
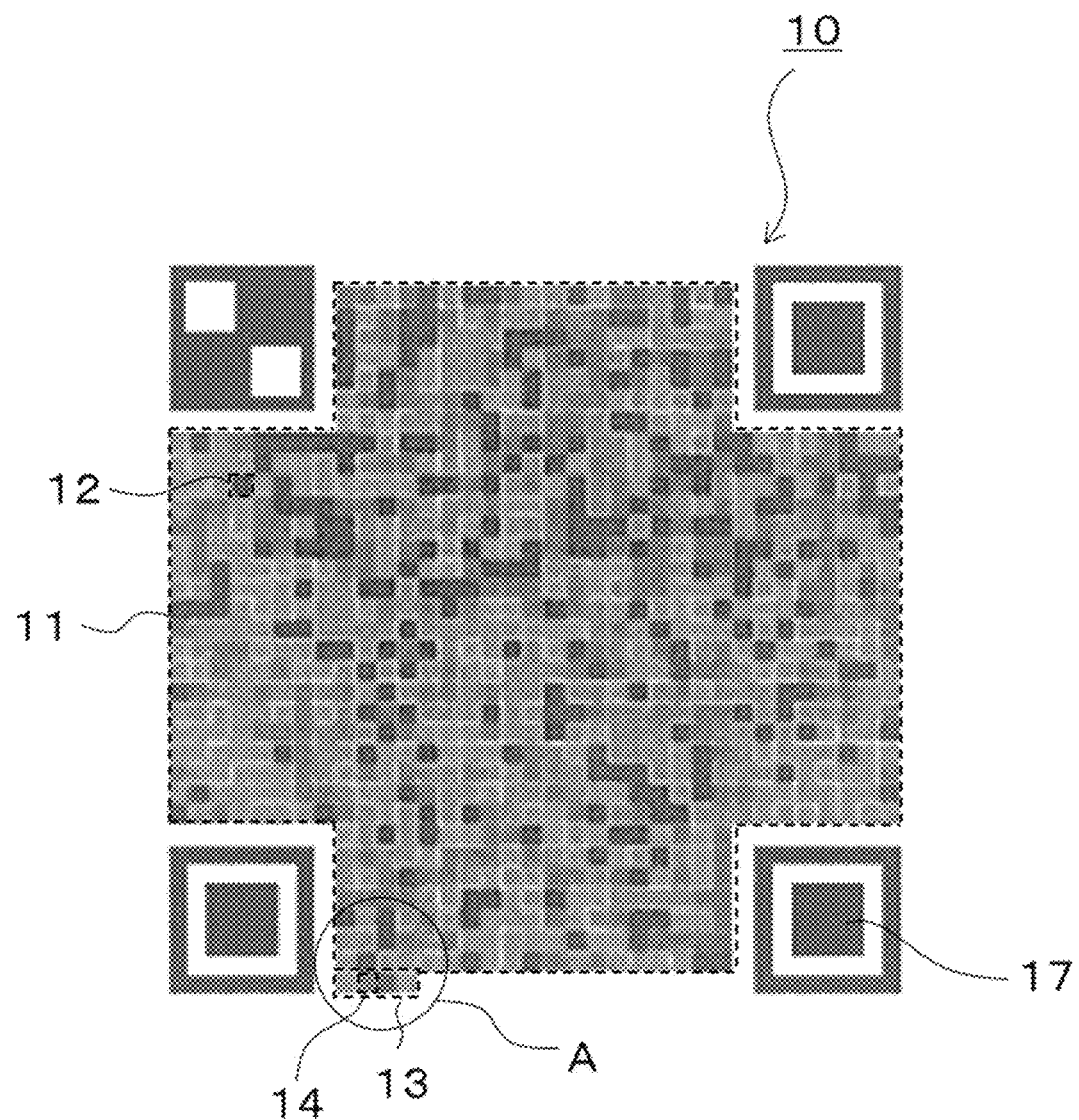
FIG. 1 is a view showing an example of an information code according to a first embodiment.
Figure 2:
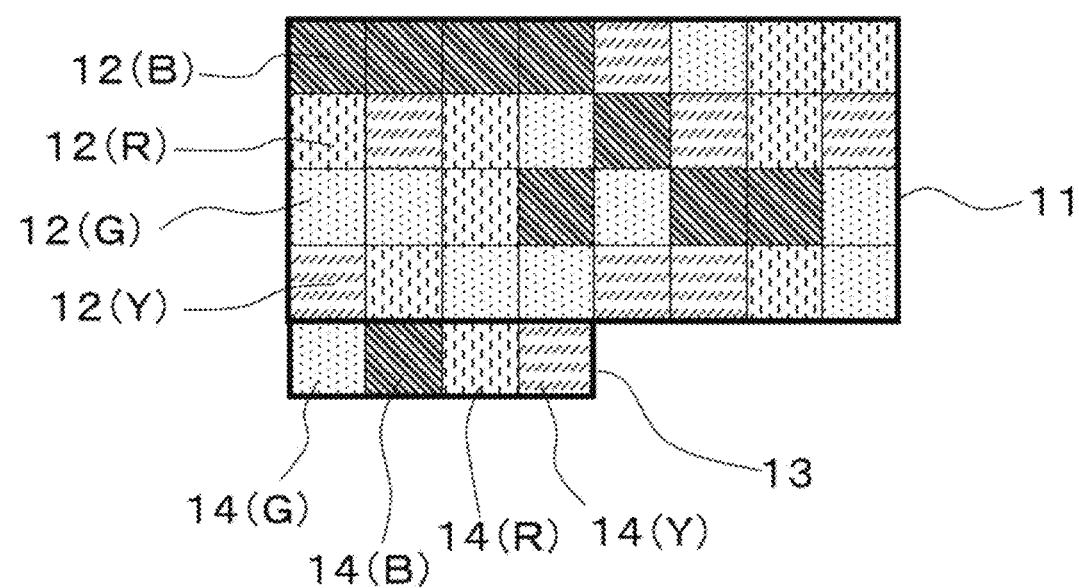
FIG. 2 is an enlarged view of part A of FIG. 1.

FIG. 1 is a view showing an example of an information code 10 according to the present embodiment, and FIG. 2 is an enlarged view of part A of FIG. 1. As shown in FIGS. 1 and 2, the information code 10 according to the present embodiment is a rectangular two-dimensional code having an information code area 11 constituted of colored information cells 12 with two or more colors, which serve as information indication units, a teacher code area 13 having teacher cells 14 with the same colors and the same number of colors as the information cells 12 so as to identify the colors of the information cells 12, and finder symbols 17.

The information code area 11 is constituted of the information cells 12 with two or more colors arranged in a lattice. As far as there are two or more colors, the colors of the information cells 12 are not particularly limited. As described later, the present invention enhances accuracy of identifying the colors of the information cells 12 using the teacher cells 14, which is particularly useful for a case where the two or more colors are relatively similar in hue to each other, though two colors of black and white may also be applicable, for example. As far as there are two or more colors, the number of colors of the information cells 12 and the number of colors of the teacher cells 14 are not particularly limited, but are preferably four, eight, or sixteen such that the number of bits is fitted with the amount of information. In the configuration example for description of the present embodiment, four colors of red, blue, green, and yellow, are used as the colors of the information cells 12 constituting the information code area 11. In FIG. 2, a red information cell, a blue information cell, a green information cell, and a yellow information cell are indicated by 12(R), 12(B), 12(G), and 12(Y), respectively. In this way, using the information cells 12 having color information of four colors can double the information amount (to two bits) per information cell compared to an information code composed of black and white information cells, but the four colors are similar in hue to each other. As a result, appropriate identification of the colors of the information cells 12 is sometimes difficult depending on a light environment such as illumination, a print environment of the information code, a display environment of the information code on a display or the like, color fading with age of the printed information code, or the like. Hence, in the present embodiment, the teacher code area 13 described later is provided to enhance accuracy of identifying the colors of the information cells 12.

The information code area 11 can record a certain amount of specific information composed of textual information and/or binary information by changing an indication pattern of the information cells 12 as information units. Contents of the specific information recorded in the information code area 11 are not particularly limited, but, in the present embodiment, it is assumed that personal information including biometric information for biometric authentication is stored. The personal information may include, in addition to the biometric information, information such as an Individual Number, a passport number, an account number, a car license number, a name, a social insurance number, a birthday, a birthplace, and an original family name. Furthermore, the biometric information may include a face image, fingerprint information, iris information, a hand shape, a retina, blood vessels, a voice, an ear shape, and the like. In the configuration example for description of the present embodiment, a face image is included.

Since the information code area 11 in which the specific information is recorded is constituted of the information cells 12 with the four colors, the information amount to be recorded in the information code 10 according to the present embodiment is greater than in the information code constituted of the two colors of black and white. However, in a case where a face image for face authentication is recorded in the information code 10, recording an entire face image with sufficient resolution for face authentication might cause shortage of storage capacity even when the information code area 11 is constituted of the information cells 12 with four colors. Thus, the information code 10 according to the present embodiment stores, as the face image for the face authentication, not an entire face of a user but only a part of the face such as eyes or a mouth of the user that provides feature points for the face authentication, so that the face image for the face authentication can be recorded in the information code 10.

The teacher code area 13 is placed outside the information code area 11. The teacher code area 13 is constituted of a plurality of teacher cells 14. The teacher cells 14 have the same colors and the same number of colors as the information cells 12. For example, when the information code area 11 is constituted of the information cells 12 with four colors of red, blue, green, and yellow, the teacher code area 13 is also constituted of the teacher cells 14 with the four colors of red, blue, green, and yellow as with the information cells 12. In FIG. 2, a red teacher cell, a blue teacher cell, a green teacher cell, and a yellow teacher cell are indicated by 14(R), 14(B), 14(G), and 14(Y), respectively.

In the present embodiment, as shown in FIGS. 1 and 2, the teacher code area 13 has one teacher cell 14 for each color, and the number of the teacher cells 14 (four) included in the teacher code area 13 is the same as the number of colors (four) of the information cells 12 constituting the information code area 11. For example, in the present embodiment, the teacher code area 13 has a total of four teacher cells 14 with respective colors of red, blue, green, and yellow in one-to-one correspondence. However, the present invention is not limited to this configuration, and there may be a total of five or more teacher cells 14 with the four colors. Furthermore, the teacher cells 14 included in the teacher code area 13 may include a teacher cell 14 with a color not used for the information cells 12. For example, the teacher code area 13 may further have a teacher cell 14 with purple for identification of red and blue. In this case, for example, when color information of an information cell 12 is purple tint and is difficult to identify as being red like or blue like, if the color information is closer to red with respect to color information of the purple teacher cell 14, the color of the information cell 12 can be determined to be red. Note that the color information can be quantified as an RGB value or a CMY value.

FIG. 1 illustrates a configuration where the teacher code area 13 is placed on the left lower side of the information code area 11, but the position of the teacher code area 13 is not particularly limited. Moreover, in the configuration illustrated in FIG. 1, the teacher code area 13 is placed in contact with the information code area 11, but the teacher code area 13 may be placed away from the information code area 11. Furthermore, in the configuration illustrated in FIG. 1, the information code 10 has only one teacher code area 13, but the present invention is not limited to this configuration. There may be a plurality of teacher code areas 13 such as one teacher code area 13 placed on the upper side of the information code area 11 and another on the lower side.

Next, an information code utilization device 20 according to the present embodiment will be described. The information code utilization device 20 according to the present embodiment is a device having functions of generating an information code 10 according the first embodiment and reading the information code 10. Examples of the information code utilization device 20 include a smartphone, a tablet, a personal computer, and a dedicated machine installed at a public office or the like.

Figure 3:
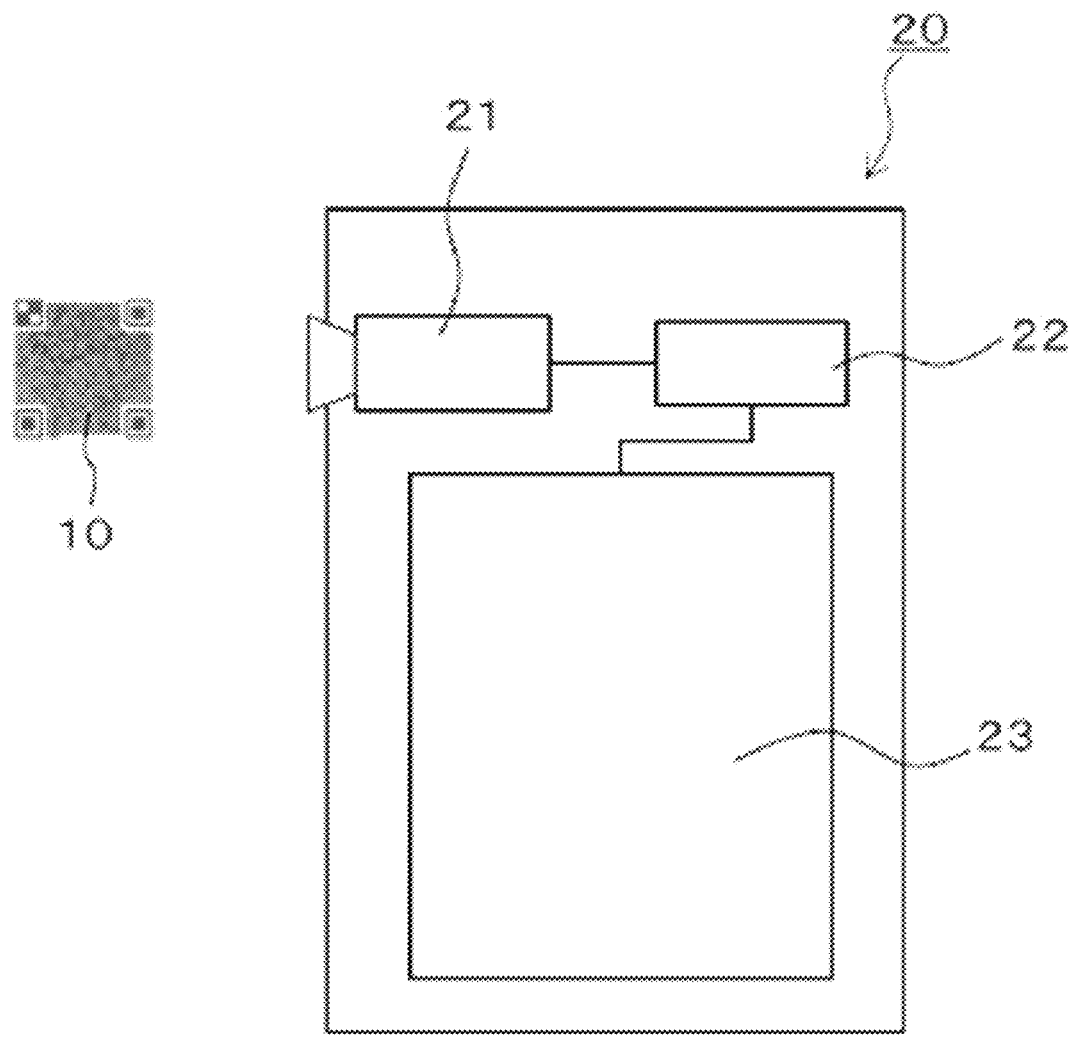
FIG. 3 is a configuration diagram of an information code utilization device according to the present embodiment.

FIG. 3 is a configuration diagram of the information code utilization device 20 according to the present embodiment. As shown in FIG. 3, the information code utilization device 20 according to the present embodiment has a reader 21, an information processor 22, and a display unit 23. Hereinafter, the components of the information code utilization device 20 will be described.

The reader 21 is, for example, a camera such as a CCD or CMOS camera, and captures the information code 10 displayed on a display of user's mobile terminal or the information code 10 printed on a print medium by a user to output captured image data to the information processor 22. In the present embodiment, the reader 21 can also capture user's face to output image data of the user's face to the information processor 22.

The information processor 22 has a storage device and a processing device. The information processor 22 has, by executing in the processing device an information code generation program and an information code reading program stored in the storage device, an information code reading function to read specific information recorded in an information code 10 from image data of the information code 10 captured by the reader 21, an information code generation function to generate an information code 10 based on specific information a user wants to present, and an information code output function to output the generated information code 10. The information code generation program and the information code reading program can be downloaded from a server separately or together, and the downloaded programs can be installed into the information code utilization device 20 such as a smartphone to be executed. Hereinafter, the functions of the information processor 22 will be described.

The information code reading function extracts and reads the specific information recorded in the information code 10 from image data of the information code 10. Specifically, first, the information code reading function specifies the teacher code area 13 of the information code 10. As shown in FIG. 1, the position of the teacher code area 13 in the information code 10 is set in advance, and the information code reading function can specify the teacher code area 13 from a positional relationship of the information code 10 (for example, a positional relationship with the finder symbols 17). Then, the information code reading function reads the teacher cells 14 of the teacher code area 13 to acquire color information of the teacher cells 14. The teacher cells 14 with the respective colors are arranged in a predetermined order in the teacher code area 13. For example, in the present embodiment, as shown in FIG. 1, the teacher cells 14 with green, blue, red, and yellow are arranged in this order from the left. Accordingly, for example, the information code reading function can identify color of an information cell 12 having the same (or similar) color information as the green teacher cell 14 as being green, color of an information cell 12 having the same (or similar) color information as the red teacher cell 14 as being red, color of an information cell 12 having the same (or similar) color information as the blue teacher cell 14 as being blue, and color of an information cell 12 having the same (or similar) color information as the yellow teacher cell 14 as being yellow. In this way, the information code reading function can identify the colors of the information cells 12 with high accuracy based on the color information of the teacher cells 14. Then, the information code reading function acquires the specific information recorded in the information code area 11 based on the information cells 12 of which the colors are identified based on the teacher cells 14.

The information code generation function generates an information code 10 having an information code area 11 and a teacher code area 13, as shown in FIG. 1. Specifically, the information code generation function generates the information code area 11 and the finder symbols 17 in a similar manner to that in a well-known technology. FIG. 1 illustrates a configuration including four finder symbols 17, but providing at least three finder symbols 17 would allow for recognition of the orientation of the information code 10. The information code generation function also generates the teacher code area 13 having the teacher cells 14 with the same colors and the same number of colors as the information cells 12, and places the teacher code area 13 on the left lower side of the information code area 11. In the present embodiment, the information code generation function generates the teacher code area 13 constituted of the teacher cells 14, the number of which is the same as the number of colors of the information cell 12, with one teacher cell 14 for each color. That is, in the present embodiment, as shown in FIG. 1, there is generated the teacher code area 13 in which the four teacher cells 14 with green, blue, red, and yellow are arranged in a line in this order from the left. Note that the arrangement order of the teacher cells 14 may be changed as appropriate.

The information code output function outputs the information code 10 generated by the information code generation function for the user to be able to utilize it. Specifically, the information code output function can output the information code 10 to the display unit 23 to cause the information code 10 to be displayed on a display of the display unit 23. The information code output function can also output the information code 10 to a printer, not shown, to cause the information code 10 to be printed on a print medium.

Figure 4:
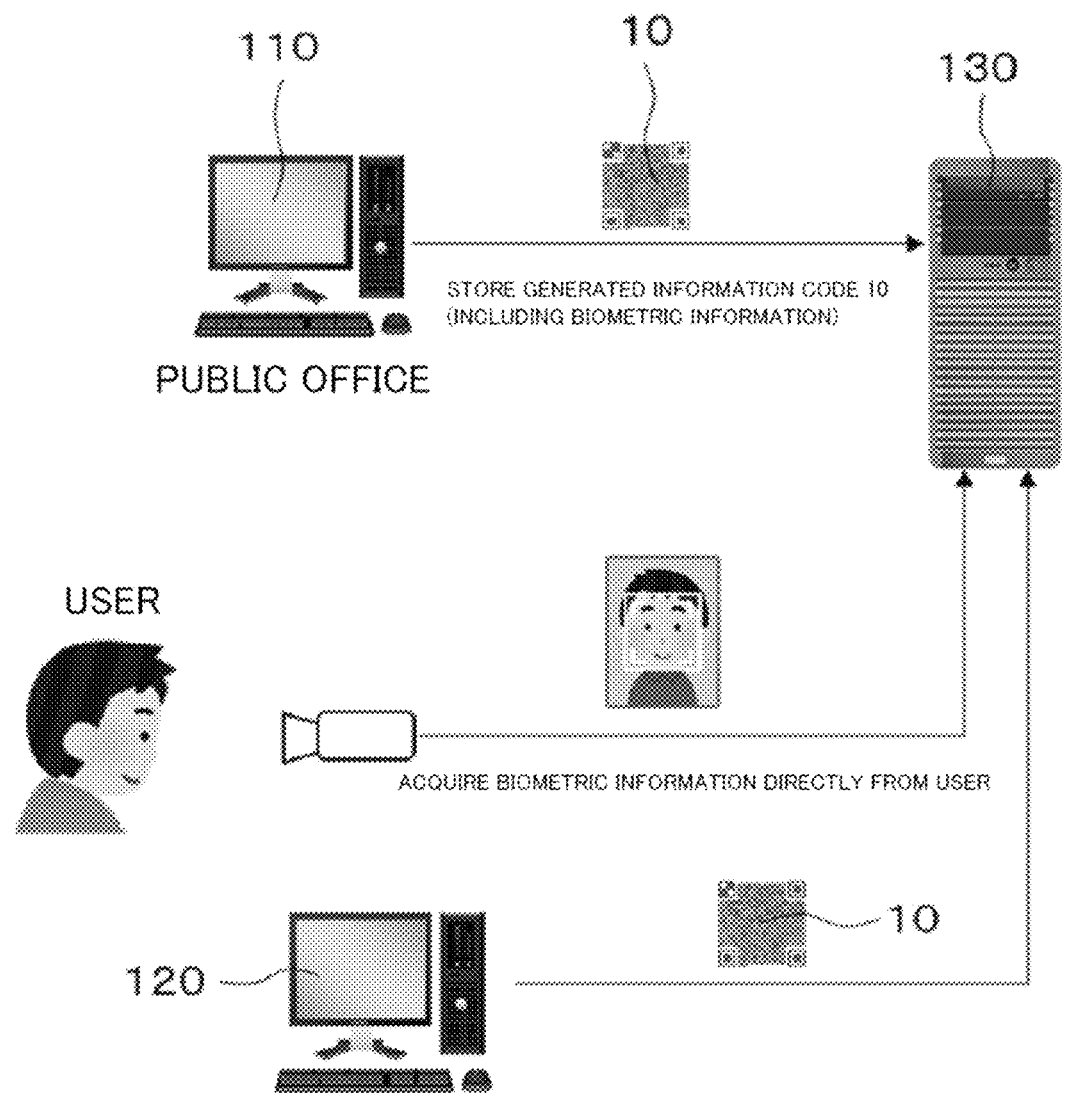
FIG. 4 is a diagram showing an outline of an information code utilization system according to the first embodiment.

Herein, an information code utilization system 100 that uses an information code 10 according to the first embodiment will be described. FIG. 4 is a configuration diagram showing the information code utilization system 100 according to the first embodiment. As shown in FIG. 4, the information code utilization system 100 according to the first embodiment has an information code generation device 110 that generates an information code 10, an information code reading device 120 that is equipped with a camera and reads the information code 10, and an authentication server 130. FIG. 4 illustrates a situation for description where a public office provides a public service to a user based on personal information of the user. In the situation, the user, in advance, uses the information code generation device 110 of the public office to generate an information code 10 and to store the generated information code 10 in the authentication server 130. When the user applies for the public service, user's identity is verified for user authentication by comparing the information code 10 presented by the user with the information code 10 stored in the authentication server 130, and checking user's face image acquired directly from the user against a face image from the information code 10 stored in the authentication server 130.

In the situation example illustrated in FIG. 4, the information code generation device 110, in advance, uses the generation program for information code 10 to generate the information code 10 having the information code area 11 in which a part of the user's face image (such as eyes or a mouth) is recorded based on the face image acquired from the user. Then, the information code generation device 110 transmits the generated information code 10 to the authentication server 130 to store the generated information code 10 in the authentication server 130.

The user, in advance, acquires the information code 10 generated by the information code generation device 110 from the public office, and, when applying for utilization of the public service, makes the information code reading device 120 of the public office read the information code 10 printed on printing material such as paper, metal, resin, or leather, or the information code 10 displayed on a display of a mobile terminal. The information code reading device 120 transmits the read information code 10 to the authentication server 130, and captures user's face image with another camera to transmit the captured user's face image to the authentication server 130.

The authentication server 130 compares the information code 10 generated and prestored by the information code generation device 110 with the information code 10 read by the information code reading device 120 for primary authentication, and extracts the face image for authentication from the prestored information code 10 to check the face image against the user's face image transmitted from the information code reading device 120 to verify whether the user is identified as a person recorded in the information code 10 for secondary authentication. Then, the authentication server 130 permits provision of the public service to the user if the user's identity is verified.

As described above, in the first embodiment, the information code 10 has the information code area 11 composed of the colored information cells 12 with two or more colors, which serve as information indication units, and the teacher code area 13 composed of the teacher cells 14 with the same colors and the same number of colors as the information cells 12 so as to identify the colors of the information cells 12. With this configuration, even under an environment such as a light environment, a print environment, or a display environment that makes identification of the colors of the information cells 12 difficult or under a condition of the printed information code such as color fading with age, acquiring the color information from the teacher cells 14 with the same colors as the information cells 12 under the same environment and the same condition allows for identifying the colors of the information cells 12 constituting the information code area 11 with high accuracy even under such an environment or such a condition. Especially, in the information code 10 having the information cells 12 including the color information of a plurality of colors such as four or eight colors, the colors tend to be similar in hue to each other and to be difficult to identify compared to those in an information code composed of two colors of black and white. Therefore, identifying the colors of the information cells 12 using the teacher cells 14 is particularly useful for the information code 10 with such colors.

Furthermore, in the information code 10 according to the first embodiment, the teacher code area 13 has the teacher cells 14 with the one-to-one colors, and the number of the teacher cells included in the information code 10 is the same as the number of colors of the information cell 12. That is, in the example shown in FIG. 1, the teacher code area 13 has a total of four teacher cells 14 with the respective colors of red, blue, green, and yellow in one-to-one correspondence. This configuration of the teacher code area 13 can reduce a space required for the teacher code area 13 and make the teacher code area 13 unobtrusive. Herein, the number of the teacher cells 14 may be a multiple of the number of colors of the teacher cells, and moreover, a marginal side of the information code area 11 may be utilized as the teacher code area 13.

Second Embodiment

Figure 5:
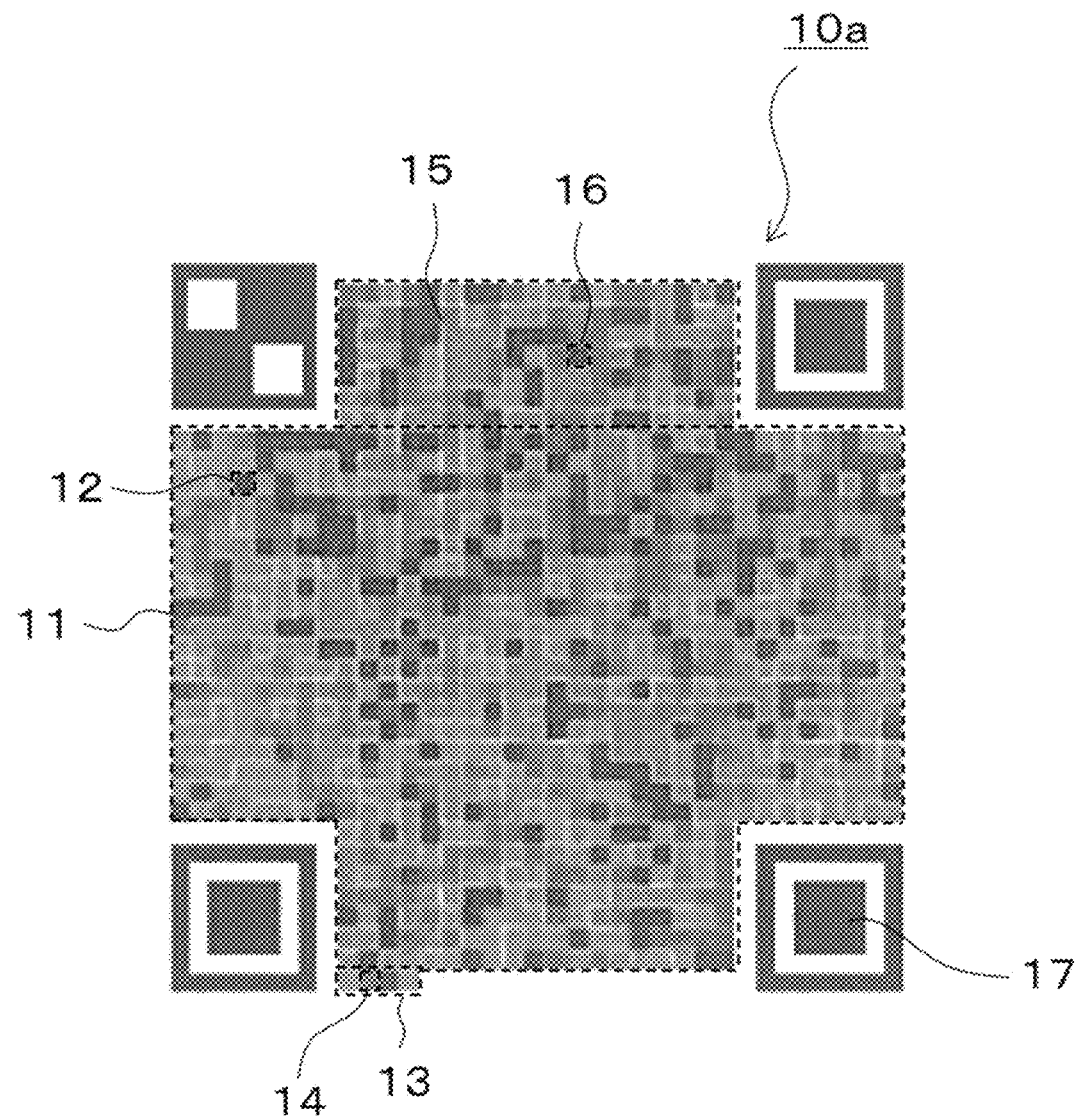
FIG. 5 is a view showing an example of an information code according to a second embodiment.

Next, a second embodiment of the present invention will be described. FIG. 5 is a view showing an example of an information code 10a according to the second embodiment. As shown in FIG. 5, the information code 10a according to the second embodiment is similar to the information code 10 according to the first embodiment except for having an advertisement code area 15 in which advertisement information is recorded in addition to an information code area 11 in which information subject to record keeping is recorded.

Like the information code area 11, the advertisement code area 15 is constituted of advertisement cells 16 with two or more colors, and has the advertisement information recorded therein for displaying an advertisement, such as a URL by which a website for the advertisement is accessed. Like the information cells 12, the advertisement cells 16 constituting the advertisement code area 15 have the same colors and the same number of colors as teacher cells 14 constituting a teacher code area 13. Therefore, also in the advertisement code area 15, it is possible to identify the colors of the advertisement cells 16 with high accuracy based on the color information of the teacher cells 14.

In the information code utilization device 20 in the second embodiment, the information code reading function of the information processor 22 reads the advertisement information recorded in the advertisement code area 15 in addition to the specific information recorded in the information code area 11. Specifically, the information code reading function acquires the color information of the teacher cells 14 of the teacher code area 13, and then identifies the colors of the advertisement cells 16 in the advertisement code area 15 based on the color information of the teacher cells 14. For example, the information code reading function identifies color of an advertisement cell 16 having the same (or similar) color information as a green teacher cell 14 as being green, color of an advertisement cell 16 having the same (or similar) color information as a red teacher cell 14 as being red, color of an advertisement cell 16 having the same (or similar) color information as a blue teacher cell 14 as being blue, and color of an advertisement cell 16 having the same (or similar) color information as a yellow teacher cell 14 as being yellow. Accordingly, as in the information cells 12, even under an environment such as a light environment, a print environment, or a display environment that makes identification of the colors of the advertisement cells 16 difficult or under a condition of a printed information code 10a such as color fading with age, the information code reading function acquires the color information from the teacher cells 14 with the same colors as the advertisement cells 16 under the same environment and the same condition to appropriately read the advertisement information recorded in the advertisement code area 15 even under such an environment and such a condition so that the advertisement based on the advertisement information is displayed on the display of the display unit 23. The information code reading function can also read the specific information recorded in the information code area 11 and display information based on the specific information on the display of the display unit 23 after or while the advertisement based on the advertisement information is displayed.

In this way, the information code 10a according to the second embodiment has the advertisement code area 15, and the information code utilization device 20 can read the information code 10a according to the second embodiment to display the advertisement based on the advertisement information recorded in the advertisement code area 15 in addition to the information based on the specific information recorded in the information code area 11.

Figure 6:
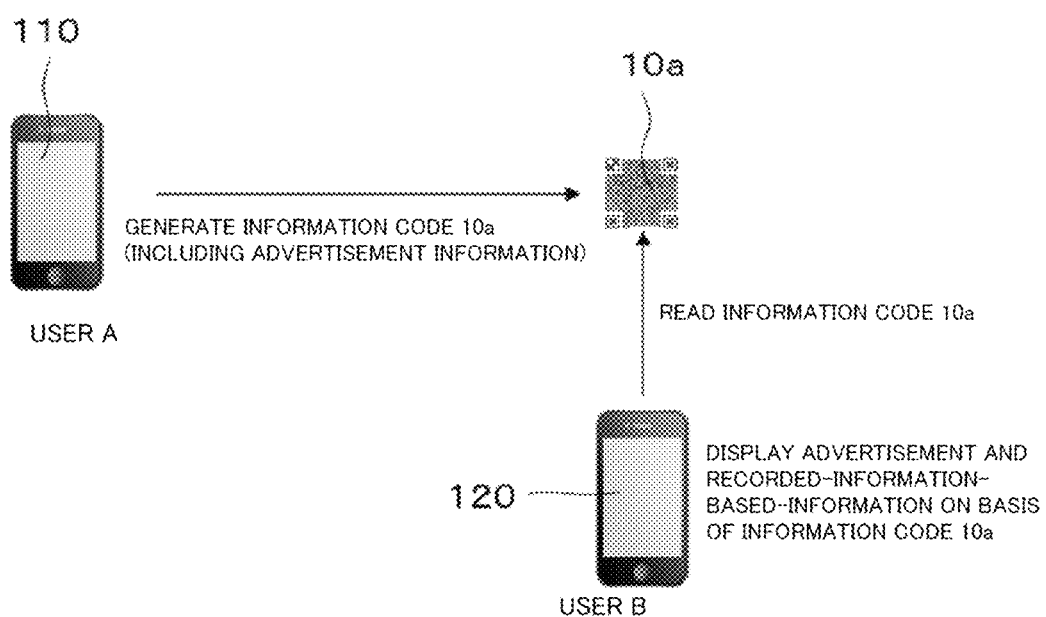
FIG. 6 is a diagram showing an outline of an information code utilization system according to the second embodiment.

Next, an information code utilization system 100a that uses an information code 10a according to the second embodiment will be described. FIG. 6 is a configuration diagram showing the information code utilization system 100a according to the second embodiment. As shown in FIG. 6, the information code utilization system 100a according to the second embodiment has an information code generation device 110 that generates an information code 10a and an information code reading device 120 that is equipped with a camera and reads the information code 10a. Hereinafter, a situation is illustrated for description with reference to FIG. 6, where, when displaying the information based on the specific information recorded in the information code area 11 of the information code 10a, the information code reading device 120 also displays the advertisement based on the advertisement information recorded in the advertisement code area 15 of the information code 10a, so that a user can use the generation program and the reading program for information code 10a at no cost or with receiving affiliate compensation or the like.

In the example shown in FIG. 6, a user A who wants to generate an information code 10a downloads the generation program for information code 10a according to the present embodiment from a dedicated server into an information terminal of the user A such as a smartphone to configure the information code generation device 110. Furthermore, a user B who wants to read an information code 10a downloads the reading program for information code 10a according to the present embodiment from the dedicated server into an information terminal of the user B such as a smartphone to configure the information code reading device 120.

The user A who wants to generate an information code 10a uses the information code generation device 110 to generate an information code 10a including the information code area 11 in which specific information according to information the user A wants to display is recorded, the teacher code area 13, and the advertisement code area 15 in which advertisement information for displaying a predetermined advertisement is recorded. In the example shown in FIG. 6, the generation program for information code 10a is built, in advance, so as to record advertisement information arbitrarily chosen by a program provider in the advertisement code area 15.

The user B who wants to read an information code 10a uses the information code reading device 120 to read the information code 10a. Specifically, the information code reading device 120 acquires the color information of the teacher cells 14 constituting the teacher code area 13 of the information code 10a, and then identifies the colors of the advertisement cells 16 constituting the advertisement code area 15 based on the color information of the teacher cells 14. Then, the information code reading device 120 reads the advertisement information from the advertisement code area 15 composed of the advertisement cells 16 of which the colors are identified to display the advertisement based on the advertisement information on the display of the display unit 23. Furthermore, the information code reading device 120 identifies the colors of the information cells 12 constituting the information code area 11 based on the color information of the teacher cells 14, and reads the specific information from the information code area 11 to display the information based on the specific information after the advertisement is displayed or along with the advertisement.

As described above, the information code 10a according to the second embodiment has the advertisement code area 15 in which advertisement information is recorded in addition to the information code area 11 and the teacher code area 13. With this configuration, the information code 10a according to the second embodiment allows for displaying an advertisement based on the advertisement information recorded in the advertisement code area 15 in addition to the information based on the specific information recorded in the information code area 11.

In the configuration example of the second embodiment described above, the information code 10a has the advertisement code area 15 in which advertisement information for displaying an advertisement is recorded, but the present invention is not limited to this configuration. There may be provided another code area in which information other than the advertisement information is recorded, for example, information for displaying a message, a warning, a consent document, or the like, separately from the information code area 11 and the teacher code area 13.

Third Embodiment

Figure 7:
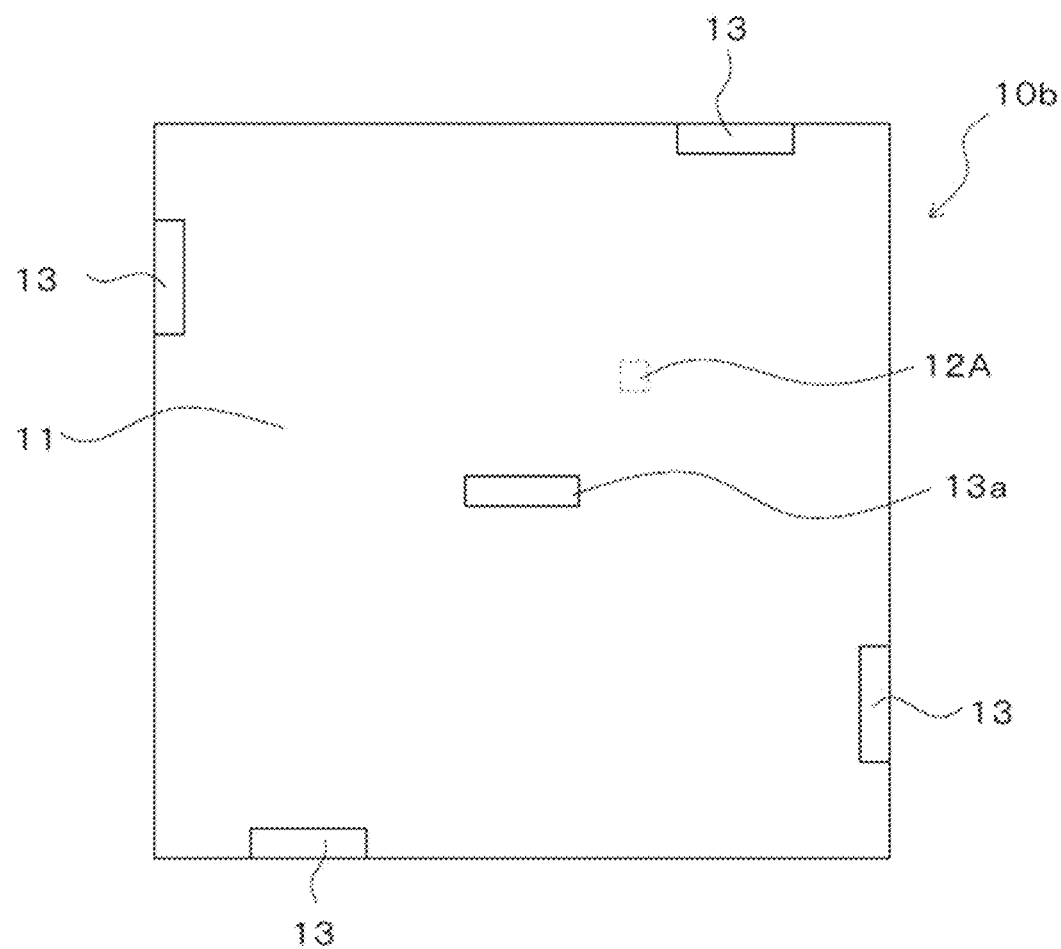
FIG. 7 is a view showing an example of an information code according to a third embodiment.

Next, a third embodiment of the present invention will be described. FIG. 7 is a view showing an example of an information code 10b according to the third embodiment. As shown in FIG. 7, the information code 10b according to the third embodiment is different from the information code 10 according to the first embodiment in that a teacher code area 13a is placed inside an information code area 11 (inside the information code 10b). In the information code 10b according to the third embodiment, a plurality of teacher code areas 13 are also placed outside the information code area 11.

Figure 8:
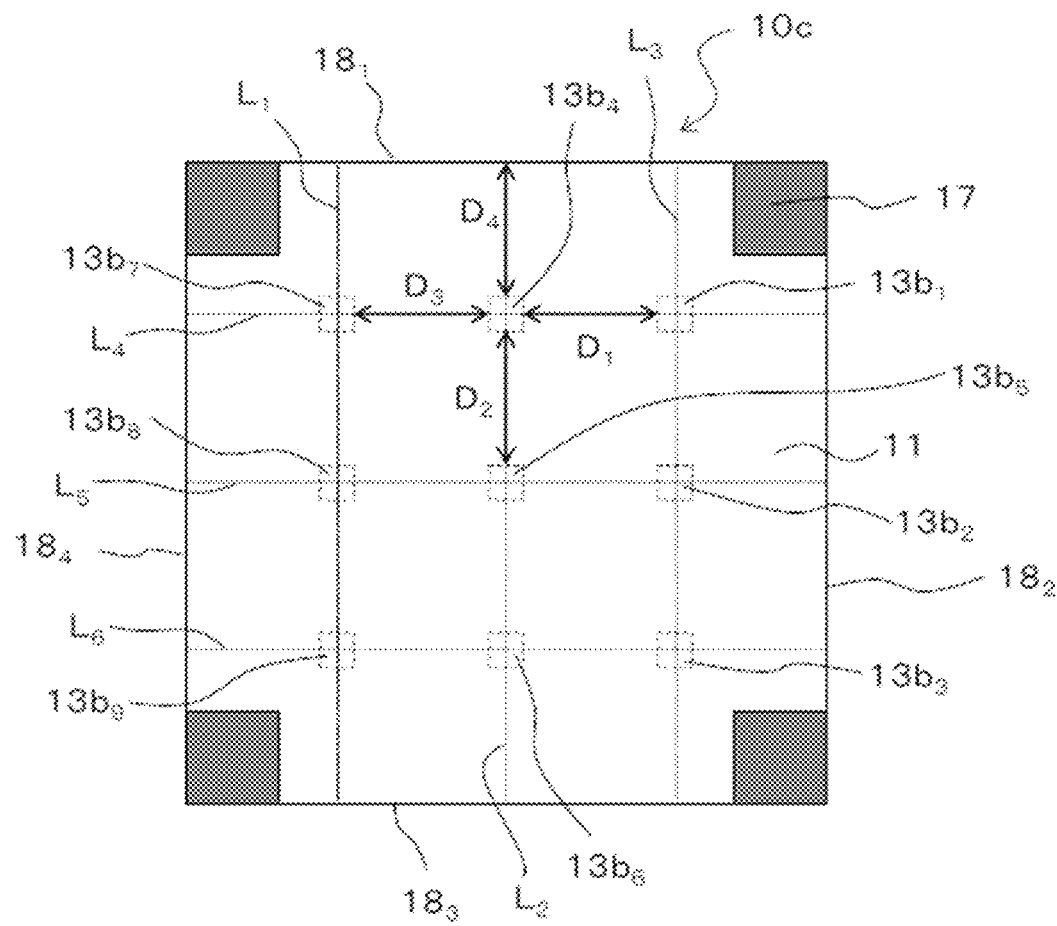
FIG. 8 is a view showing an example of an information code according to a fourth embodiment.

Herein, in the present invention, "the teacher code area 13a is placed inside the information code area 11" means that the teacher code area 13a is surrounded by the information code area 11 and is placed within the information code 10b. In FIG. 7, the teacher code area placed inside the information code area 11 is shown as the teacher code area 13a. Hence, the teacher code areas 13 shown in FIG. 7 are not teacher code areas placed inside the information code area 11. However, as shown in FIG. 8 described later, all the teacher code areas may be placed inside the information code area 11, or, as shown in FIG. 7, only the teacher code area 13a as a part of a plurality of teacher code areas 13, 13a may be placed inside the information code area 11. Furthermore, FIG. 7 illustrates a configuration where the teacher code area 13a placed inside the information code area 11 is in contact with the information code area 11 without any space, but the present invention is not limited to this configuration, and a space (blank) may be provided between the teacher code area 13a and the information code area 11.

In the third embodiment, the information code utilization device 20 can read the information code 10b as described below. That is, the reader 21 of the information code utilization device 20 specifies a teacher code area 13, 13a that is closest to a reading-target information cell 12 and checks up the specified teacher code area 13, 13a to be able to read the color of the reading-target information cell 12. For example, in a case where an information cell 12A in the example shown in FIG. 7 is the reading-target information cell 12, the reader 21 specifies the teacher code area 13a located inside the information code area 11 as the teacher code area that is closest to the reading-target information cell 12A, and refers to this teacher code area 13a to be able to identify the color of the reading-target information cell 12A.

As described above, in the third embodiment, placing the teacher code area 13a also inside the information code 10b (the information code area 11) allows for identifying the color of an information cell 12 located near the center of the information code area 11 by reference to the closer teacher code area 13a, so that judgment accuracy for the information cell 12 can be further enhanced. Especially, in a case where the number of colors of the information cells 12 is greater, such as eight, differences in the colors are smaller, causing more erroneous judgments for the information cells 12 due to illumination or reflection, and, therefore, the information code 10b according to the third embodiment is advantageous.

Fourth Embodiment

Next, a fourth embodiment of the present invention will be described. FIG. 8 is a view showing an example of an information code 10c according to the fourth embodiment. As shown in FIG. 8, in the information code 10c according to the fourth embodiment, a teacher code area $13b_1$ to $13b_9$ is placed inside an information code area 11 as in the information code 10b according to the third embodiment. Furthermore, as shown in FIG. 8, in the information code 10c according to the fourth embodiment, there is a plurality of teacher code areas $13b_1$ to $13b_9$ placed inside the information code area 11. Specifically, in the example shown in FIG. 8, there are nine teacher code areas $13b_1$ to $13b_9$, all of which are placed inside the information code area 11.

In the fourth embodiment, all the teacher code areas $13b_1$ to $13b_9$ are placed at even intervals. Furthermore, the teacher code areas $13b_1$ to $13b_4$, $13b_6$ to $13b_9$ close to edges $18_1$ to $18_4$ of the information code area 11 are placed such that their respective distances to their close edges $18_1$ to $18_4$ of the information code area 11 are equal to their respective distances to their adjacent teacher code areas $13b_1$ to $13b_9$. For example, the teacher code area $13b_4$ shown in FIG. 8 is placed such that a distance $D_1$ from the teacher code area $13b_4$ to the teacher code area $13b_1$, a distance $D_2$ from the teacher code area $13b_4$ to the teacher code area $13b_5$, a distance $D_3$ from the teacher code area $13b_4$ to the teacher code area $13b7$, and a distance $D_4$ from the teacher code area $13b_4$ to the edge $18_1$ of the information code area 11 that is close to the teacher code area $13b_4$ are all equal.

In other words, in the fourth embodiment, as shown in FIG. 8, the teacher code areas 13b are placed at intersections of dividing lines $L_1$ to $L_3$ laterally dividing the information code 10c equally and dividing lines $L_4$ to $L_6$ vertically dividing the information code 10c equally. For example, in the example shown in FIG. 8, the teacher code area $13b_7$ is placed at the intersection of the dividing line $L_1$ laterally dividing the information code 10c into equal quarters and the dividing line $L_4$ vertically dividing the information code 10c into equal quarters. The other teacher code areas $13b_1$ to $13b_6$, $13b_8$ are similarly placed at the intersections of the dividing lines $L_1$ to $L_3$ laterally dividing the information code 10c into equal quarters and the dividing lines $L_4$ to $L_6$ vertically dividing the information code 10c into equal quarters.

Note that, in the example shown in FIG. 8, the number of the teacher code areas 13b is nine, but is not limited to nine, and may be changed to four, sixteen, twenty-five, and so on, depending on a size of the information code 10c (the number of the information cells 12). Herein, there is concern that the greater a distance from an information cell 12 to a teacher code area 13b, the worse discrimination accuracy for the information cell 12. Hence, it is advantageous to adjust the number of the teacher code areas 13b such that a distance from any information cell 12 at any position to a teacher code area 13b is not greater than a predetermined distance. For example, as shown in FIG. 8, in a case where the information code 10c is constituted of 128×128 cells, evenly placing the nine teacher code areas $13b_1$ to $13b_9$ allows for the distance from any information cell 12 at any position to a teacher code area 13b to be a distance of 32 cells or less. In a case where an information code 10c is constituted of 256×256 cells, evenly placing 49 teacher code areas 13b similarly allows for the distance from any information cell 12 at any position to a teacher code area 13b to be a distance of 32 cells or less.

Furthermore, FIG. 8 illustrates a configuration where the teacher code areas 13b are placed only within the information code area 11, but the present invention is not limited to this configuration, and a teacher code area 13 may be placed also outside the information code area 11 (the teacher code area 13 may be placed outside the information code area 11 in contact with an edge 18 of the information code area 11, or may be placed away from the information code area 11).

Figure 9A:
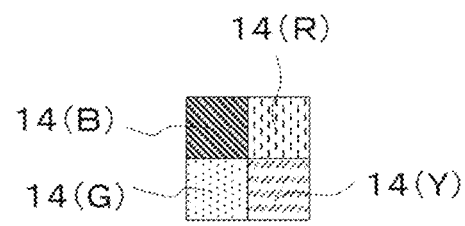
FIGS. 9A and 9B are a view showing an example of a teacher code area in the fourth embodiment.
Figure 9B:
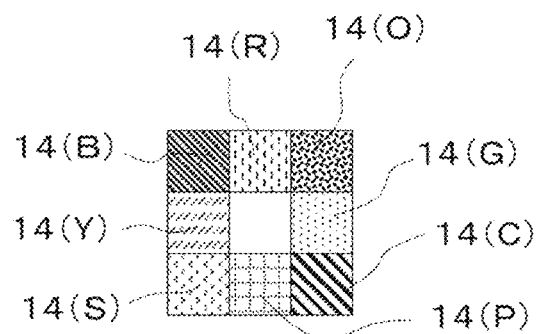

FIGS. 9A and 9B show an example of a teacher code area 13b according to the fourth embodiment. For example, in a case where the information cells 12 have four colors, the teacher code area 13b may be constituted of the teacher cells 14 with the four colors (for example, blue, red, green, and yellow), that is, teacher cells 14B, 14R, 14G, and 14Y as shown in FIG. 9A. In a case where the information cells 12 have eight colors, the teacher code area 13b may be constituted of the teacher cells 14 with the eight colors (for example, blue, red, green, yellow, purple, cyan, orange, and sky blue), that is, teacher cells 14B, 14R, 14G, 14Y, 14P, 14C, 140, and 14S as shown in FIG. 9B. In FIG. 9B, the teacher code area 13b has a center without cell (which is blank and, thus, has a color of a printing target), and is constituted of the eight teacher cells 14 surrounding the blank at the center. Alternatively, also in the fourth embodiment, the teacher code area 13 may be constituted of the teacher cells 14 placed in a line as shown in FIG. 7 (or as shown in FIG. 2). Similarly, also in the first to third embodiment described above, the teacher code area may be square shaped as a whole as shown in FIGS. 9A and 9B.

Also in the fourth embodiment, the reader 21 of the information code utilization device 20 specifies a teacher code area 13b that is closest to a reading-target information cell 12 and checks up the specified teacher code area 13b to be able to read the color of the reading-target information cell 12. Especially, in the information code 10c according to the fourth embodiment, the plurality of teacher code areas 13 are placed inside the information code area 11, allowing for shortening the distance from an information cell 12 to a teacher code area 13, so that discrimination accuracy for the information cell 12 can be enhanced.

As described above, in the fourth embodiment, placing the plurality of teacher code areas 13b inside the information code 10c (the information code area 11) allows for identifying the color of an information cell 12 located near the center of the information code area 11 by reference to a closer teacher code area 13b, so that discrimination accuracy for the information cell 12 can be further enhanced.

The preferred embodiment examples of the present invention have been described above. However, the technical scope of the present invention is not limited to the description of the above-described embodiments. Various alterations and modifications can be applied to the above embodiment examples, and such altered or modified modes also fall within the technical scope of the present invention.

The invention claimed is:

1. An information code comprising:
   an information code area constituted of colored information cells with two or more colors arranged in a lattice, the information code area having specific information recorded using the information cells as information units; and
   a teacher code area having teacher cells with the same colors and the same number of colors as the information cells so as to identify the colors of the information cells, wherein
   the teacher code area is placed away from the information code area or inside the information code area, and
   the specific information recorded in the information code area includes personal information.

2. The information code according to claim 1, wherein the teacher code area comprises a plurality of teacher code areas, and
   the plurality of teacher code areas are placed inside the information code area.

3. The information code according to claim 2, wherein the plurality of teacher code areas are placed at regular intervals inside the information code area.

4. The information code according to claim 1, wherein the number of colors of the information cells and the number of colors of the teacher cells are four or eight, and
   the number of the teacher cells included in the teacher code area is the same as the number of colors of the teacher cells.

5. The information code according to claim 1, wherein the information code comprises the information code area in which the specific information is recorded and an advertisement code area in which advertisement information is stored, and
   the advertisement code area is constituted of advertisement cells with the same colors as the information cells and the teacher cells.

6. An information code utilization system that utilizes the information code according to claim 5, comprising:
   an information code generator configured to generate the information code having the advertisement code area, the information code area, and the teacher code area; and an information code reader configured to read the information code, identify the colors of the advertisement cells of the advertisement code area based on color information of the teacher cells of the teacher code area to cause an advertisement to be displayed based on the advertisement information stored in the advertisement code area, and identify the colors of the information cells of the information code area based on the color information of the teacher cells of the teacher code area to output the specific information recorded in the information code area.

7. The information code according to claim 1, wherein the personal information recorded in the information code area is image information of a part of a face of a person.

8. An information code reading device for reading the information code according to claim 1, comprising:
 a reader configured to read the information code;
 an identification unit configured to identify the colors of the information cells of the information code area based on color information of the teacher cells in the teacher code area of the information code read by the reader; and
 an acquisition unit configured to acquire the specific information recorded in the information code area based on the information cells of which the colors are identified by the identification unit.

9. A storage medium storing a program for reading the information code according to claim 1, the program causing a computer to execute steps of:
 reading the information cells of the information code area and the teacher cells of the teacher code area;
 identifying the colors of the information cells based on color information of the teacher cells; and
 acquiring the specific information recorded in the information code area based on the information cells of which the colors are identified.

10. An information code utilization system that utilizes the information code according to claim 1, comprising:
 an information code generator configured to generate the information code having the information code area and the teacher code area, the information code area having the personal information recorded therein that includes biometric information;
 an information code reader configured to read the information code, identify the colors of the information cells of the information code area based on color information of the teacher cells of the teacher code area to acquire the biometric information from the information code area, and acquire user's biometric information directly from a user; and
 an authentication unit configured to check the biometric information acquired from the information code area against the user's biometric information acquired directly from the user.

11. A print medium having the information code according to claim 1 printed thereon.

12. An information code generation device comprising an information code generator configured to generate an information code having an information code area constituted of colored information cells with two or more colors arranged in a lattice, the information code area having specific information recorded using the information cells as information units, and a teacher code area constituted of teacher cells with the same colors as the information cells so as to identify the colors of the information cells, wherein the teacher code area is placed away from the information code area or inside the information code area and the specific information recorded in the information code area includes personal information.

13. A storage medium storing a program that causes a computer to execute a process of generating an information code having an information code area constituted of colored information cells with two or more colors, the information code area having specific information recorded using the information cells as information units, and a teacher code area having teacher cells with the same colors and the same number of colors as the information cells so as to identify the colors of the information cells, wherein the teacher code area is placed away from the information code area or inside the information code area and the specific information recorded in the information code area includes personal information.

* * * * *